M. GOHLKE.
BALL BEARING.
APPLICATION FILED NOV. 7, 1908.
1,108,899.
Patented Sept. 1, 1914.
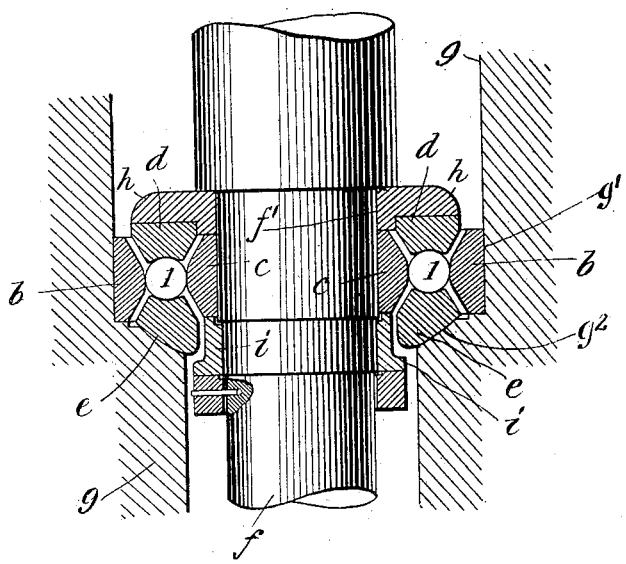
Witnesses:
Hauns. Obv.
James D'Antonio
Inventor
Max Gohlke
By his Attorneys
Rogers & Kennedy

UNITED STATES PATENT OFFICE.

MAX GOHLKE, OF BERLIN, GERMANY.

BALL-BEARING.

1,108,899.  Specification of Letters Patent.  Patented Sept. 1, 1914.

Application filed November 7, 1908. Serial No. 461,566.

*To all whom it may concern:*

Be it known that I, MAX GOHLKE, a subject of the Emperor of Germany, residing at Berlin, in the Empire of Germany, have invented certain new and useful Improvements in Ball-Bearings, of which the following is a specification, reference being had therein to the accompanying drawing.

This invention relates to anti-friction bearings, in which the rolling members are mounted between annular or ringlike casing elements, and the invention consists in an improved construction in which the rolling members are mounted between, and coöperate with, two pairs of casing elements in such manner that said members will take both radial and end thrusts, or substantially any combinations thereof, the casing elements of each pair being disconnected from each other.

The drawing represents a cross-section through a bearing embodying my invention, the same being applied to a shaft, which latter is shown in elevation.

Referring to the drawings, my improved bearing comprises a series of rolling members 1, in the present instance anti-friction balls, which are mounted between two pairs of annular casing elements or rings, one pair comprising an outer ring $b$ and an inner ring $c$, by which the radial thrusts are transmitted to the rolling members, and the other pair comprising opposing rings $d$ and $e$, by which the thrust loads are transmitted to the rolling members, there being thus four casing elements so disposed that the interposed rolling members will take both radial and thrust loads.

The bearing is shown as applied to a shaft $f$, and giving rotary support to the same within a surrounding supporting member $g$, the casing elements $c$ and $d$ being applied to the shaft while the other casing elements, $b$ and $e$, are applied to the supporting member. The supporting member $g$ is provided with an annular surface $g'$ to receive the casing element $b$ and with an annular shoulder $g^2$ to receive the casing element $e$; while the inclosed shaft $f$ is provided with an annular shoulder $h$ to receive the casing element $d$ and with a surface $f'$ to receive the casing element $c$, the several casing elements by this means being given firm and continuous support both radially and endwise.

In their adjacent faces, the several casing elements are provided with raceways or grooves, to form tracks for the rolling members, and from the edges of the grooves, the sides of the casing elements slope or incline outwardly from each other, whereby the two pairs of rings are adapted to fit or "dovetail" into each other, with the result that the raceways will conjointly surround substantially the entire circumference of the balls, sufficient clearance being left between these sloping sides to permit full load supporting contact between the raceways and balls without interference by the engagement of the sloping sides of the casing elements with each other. The inner casing element $c$ is shown as mounted between an upper collar $h$ and a lower collar $i$ on the shaft, the collar $h$ being extended outwardly, and affording a seat for the casing element $d$. Under these conditions, a thrust load on the shaft, in a downward direction, will be transmitted by the collar $h$ to ring $d$, and by it transferred to the rolling members, whence it will be transmitted to the casing element $e$, and finally received by the surrounding supporting member $g$. The radial loads will be transmitted by the casing element $c$ to the rolling members, in a direction at right angles to the direction of the thrust load, and by the rolling members will be transmitted to the outer casing element $b$, and finally received by the surrounding supporting member $g$.

It is to be understood that my improved bearing is not limited in its application to the particular form of parts shown, but may be employed with the same functions and effects in connection with other parts, and wherever it is desirable to take care of radial and thrust loads. It is further to be understood that the invention is not limited to any specific form or arrangement of parts, except in so far as such limitations are specified in the claim.

Having thus described my invention, what I claim and desire to secure by Letters Patent of the United States is as follows:

In combination with a rotary member or shaft provided with an annular shoulder and with a supporting surface, a surrounding supporting member provided with an annular supporting surface and with an annular shoulder, a casing element applied to the supporting surface of the shaft, a casing element applied to the supporting surface of the supporting member, a series of interposed balls tracking on said casing elements and acting in connection with them to take radial loads, a casing element applied to the shoulder on the shaft, and a casing element applied to the shoulder on the supporting member and formed with ball tracks, said last named casing elements acting in connection with the balls to take the end thrust loads, and all of said casing elements being provided with side surfaces sloping outwardly from their ball contact surfaces, whereby the opposing casing elements will fit into each other.

In testimony whereof I affix my signature in presence of two witnesses.

MAX GOHLKE.

Witnesses:
 WOLDEMAR HAUPT,
 HENRY HASPER.

Copies of this patent may be obtained for five cents each, by addressing the "Commissioner of Patents, Washington, D. C."